United States Patent [19]

Nagaoka

[11] Patent Number: 5,220,865

[45] Date of Patent: Jun. 22, 1993

[54] PEELING APPARATUS

[76] Inventor: Tatsuo Nagaoka, 13-12, Minowa-cho 2-chome, Kohoku-ku, Yokohama-shi, Kanagawa, 223, Japan

[21] Appl. No.: 870,869

[22] Filed: Apr. 20, 1992

[51] Int. Cl.⁵ .......................... A23N 7/00; A23N 7/02
[52] U.S. Cl. .................................. 99/590; 99/516; 99/591; 99/593; 99/630; 366/105; 366/107; 366/312
[58] Field of Search .................... 99/539-541, 99/584, 588, 589, 590-593, 623, 630, 627, 629; 426/481, 482; 366/312, 324, 102, 101, 105, 107

[56] References Cited

U.S. PATENT DOCUMENTS

| 95,741 | 10/1869 | Stainthorp | 366/224 |
|---|---|---|---|
| 298,547 | 5/1884 | Betancourt | 99/630 |
| 998,950 | 7/1911 | Beyer | 99/630 |
| 2,213,453 | 9/1940 | Schmidt | 99/630 |
| 2,753,158 | 7/1956 | Rebechini | 366/312 |
| 3,266,540 | 8/1966 | Bradham | 99/593 |
| 3,752,057 | 8/1973 | Groen, Jr. | 366/312 |
| 4,199,266 | 4/1980 | Giusti | 366/312 |
| 4,402,615 | 9/1983 | Mayer | 366/102 |
| 4,790,667 | 12/1988 | Pardo et al. | 366/312 |
| 4,983,046 | 1/1991 | Murata et al. | 366/312 |

FOREIGN PATENT DOCUMENTS

| 1212767 | 3/1966 | Fed. Rep. of Germany | 99/591 |
|---|---|---|---|
| 51-139673 | 12/1976 | Japan . | |
| 61-205467 | 9/1986 | Japan . | |

Primary Examiner—Timothy F. Simone
Attorney, Agent, or Firm—Lowe, Price, LeBlanc & Becker

[57] ABSTRACT

A peeling apparatus comprises a support shaft which is laterally mounted on a frame, a container arranged on the outside of the support shaft and having an inner surface which is curved with respect to an axis of the support shaft and with respect to an axis extending perpendicularly to the axis of the support shaft, and a cutting edge extending along an inner surface of the container and movable with respect to the container.

9 Claims, 16 Drawing Sheets

FIG.11
FIG.12
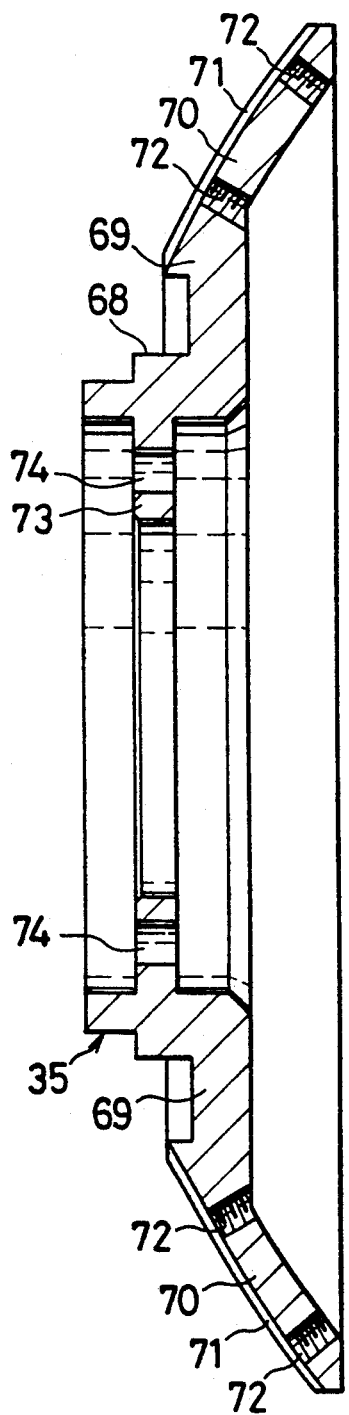
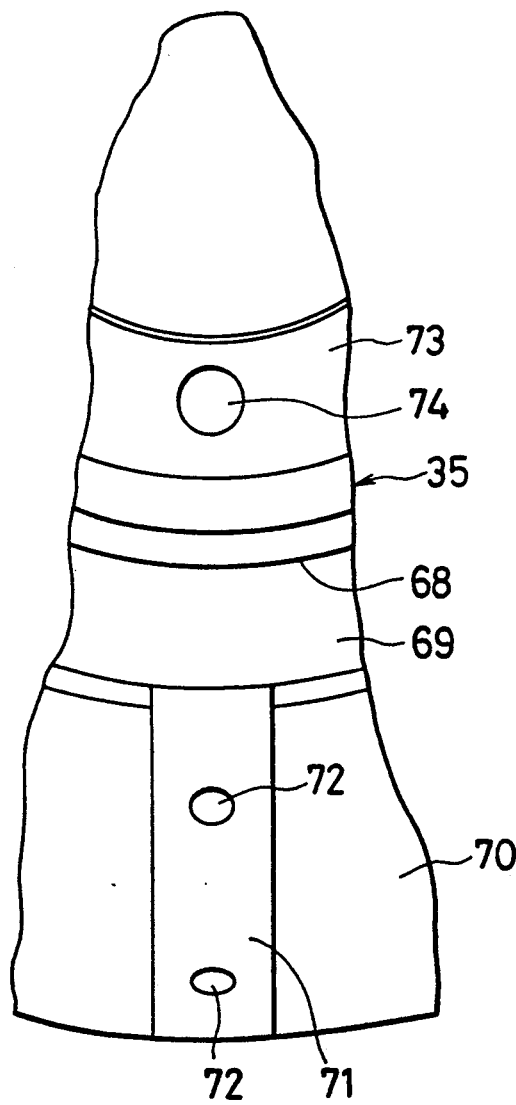

FIG.17
FIG.16
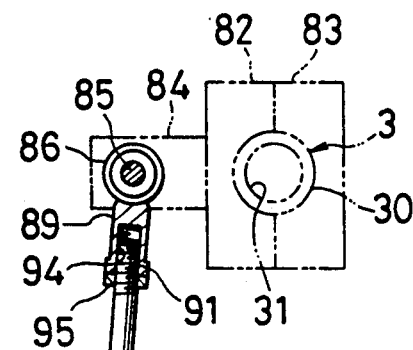
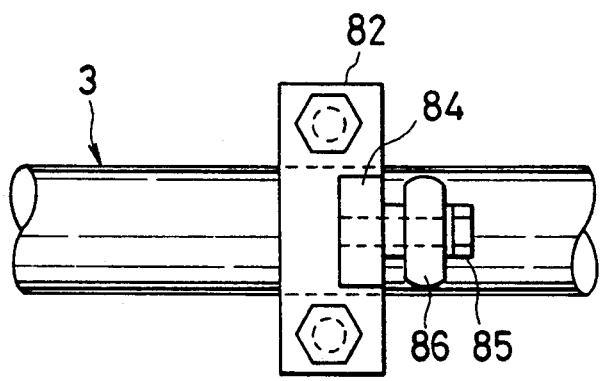

PEELING APPARATUS

BACKGROUND OF THE INVENTION

The present invention relates to a barker or a peeling apparatus suitable for peeling potatoes or the like, although not particularly limited thereto.

A peeling apparatus has been proposed in Japanese Patent Laid-Open No. 205467/1986 in which a cutter blade or edge is laterally arranged on an inner surface of a rotating cylinder or tube.

Further, a peeling apparatus is proposed in Japanese Patent Laid-Open No. 139673/1976 in which an elongated resilient or elastic element is fixedly mounted helically or spirally on an inner peripheral surface of a rotating tube, and a plurality of friction pawls made of a metallic material are fixedly mounted on the elastic element in spaced relation to each other. Furthermore, disclosed in Japanese Patent Laid-Open No. 205467/1986 is a peeling apparatus in which a cutter edge is straight along a central axis of a rotating tube. Accordingly, in the arrangement disclosed in Japanese Patent Laid-Open No. 205467/1986, contact areas between potatoes or the like and the cutter edge are small. It is difficult to uniformly peel the cuticles or epidermises of the potatoes or the like with the cutter edge. Because the amount peeled by the single cutter edge is small, more time is required for peeling the cuticles of the potatoes or the like. The cutter edge must be rotated together with the rotating tube. The potatoes or the like are largely fluctuated during rotation of the rotating tube. Thus, there is an increased chance that the potatoes or the like are damaged.

Disclosed in Japanese Patent Laid-Open No. 139673/1976 is an arrangement for peeling potatoes in which, contact areas between potatoes and friction pawls are small, thus making it difficult to uniformly peel cuticles of the potatoes by the friction pawls. Since an amount of peeling the cuticles of the potatoes due to a single friction pawl is small, time is required for peeling the cuticles of the potatoes is increased, and peeled surfaces of the potatoes are roughened. Since the friction pawl is rotated together with the rotating tube, the potatoes are largely fluctuated during rotation of the rotating tube. Accordingly, there is an increased chance that the potatoes are damaged.

SUMMARY OF THE INVENTION

It is an object of the invention to provide a peeling apparatus in which a cutting edge extends along an inner surface which is curved with respect to an axis of a support shaft and with respect to an axis extending perpendicularly to the axis of the support shaft, contact areas or surfaces between a cutting edge and potatoes thrown into a container through an input port are large, the cutting edge is only moved angularly along an inner surface of the container which is curved with respect to the support shaft, whereby it is possible to uniformly peel off cuticles or epidermises of the potatoes or the like, an amount of peeling the cuticles or epidermises of the potatoes or the like due to the cutting edge is large, lowering the amount of time required to peel off the cuticles or epidermises of the potatoes or the like, and the potatoes or the like are cut within the container which is curved with respect to the axes extending perpendicularly to each other, whereby the potatoes or the like are rotated about lateral and longitudinal axes so that it is possible to evenly or uniformly cut the cuticles or epidermises.

In the peeling apparatus, the support shaft which comprises the air pipe communicating with air supply means is laterally mounted on the frame for reciprocal angular movement. The container having the inner surface thereof which is curved with respect to the axis of the support shaft and with respect to the axis extending perpendicularly to the axis of the support shaft, preferably, a spherical inner surface outside of the support shaft, is arranged angularly movably relative to the support shaft. The input port is formed in the container, and the cutting edge extending along the inner surface of the container is arranged angularly movably with respect to the container.

The air pipe is provided with an injection nozzle within the container.

The potatoes or the like are thrown in through the input port which is formed in the container arranged outside of the support shaft which is laterally mounted on an upper part of the frame for angular movement and, subsequently, the cutting edge arranged along the inner surface of the container which is curved with respect to the axis of the support shaft and with respect to the axis extending perpendicularly to the axis of the support shaft is moved angularly, thereby uniformly peeling the cuticles of the potatoes or the like by the cutting edge.

BRIEF DESCRIPTION OF THE DRAWINGS

FIG. 11 is a longitudinal cross-sectional view of a holder;

FIG. 12 is a left-hand side elevational view of a principal portion in FIG. 11;

FIG. 16 is a front elevational view of a principal portion in FIG. 15;

FIG. 17 is a partially broken-away, side elevational view of a principal portion, showing a mounting condition of the swinging rod with respect to a connector;

DETAILED DESCRIPTION OF THE PREFERRED EMBODIMENTS

Figure 1:
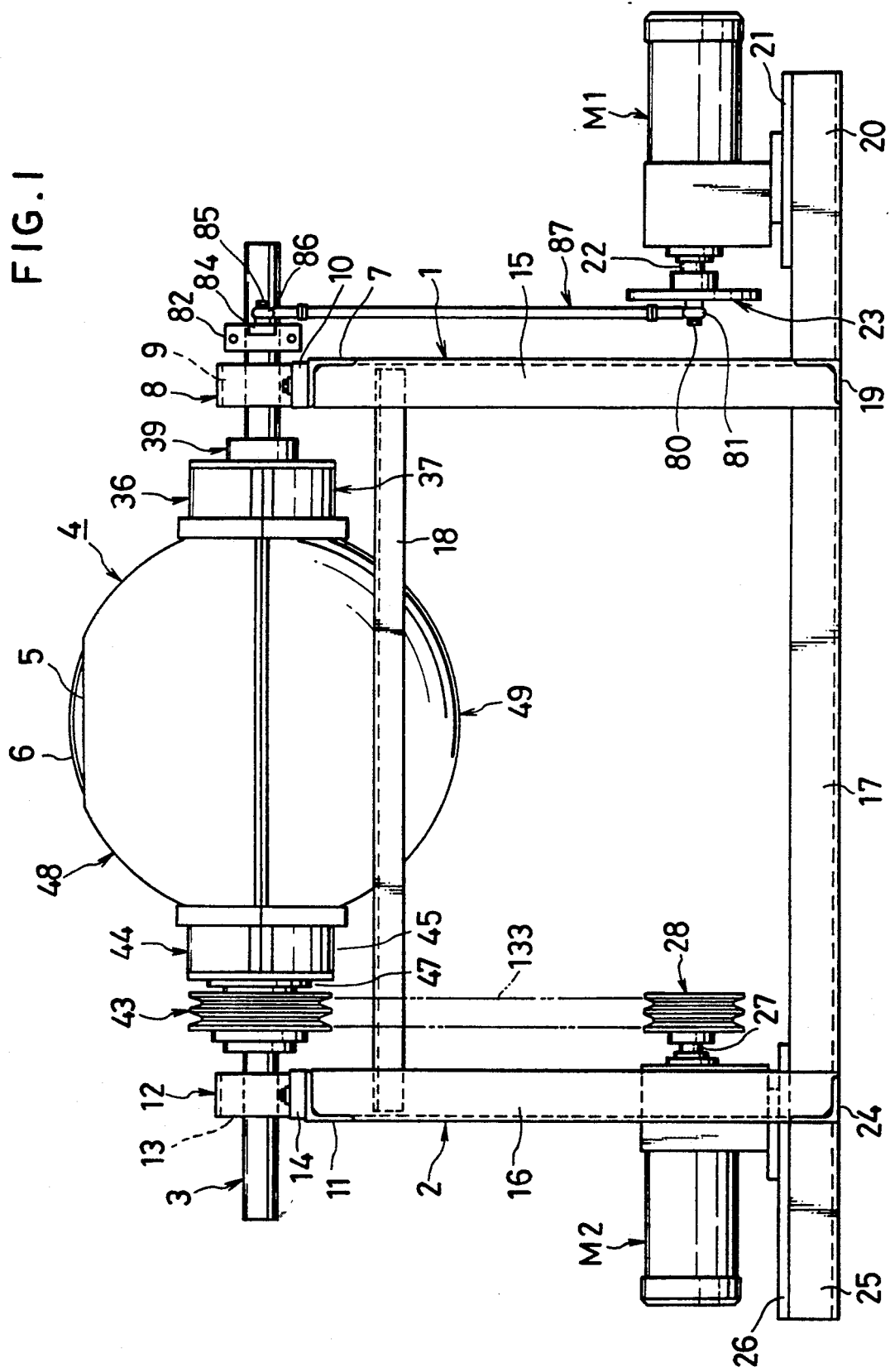
FIG. 1 is a front elevational view showing a peeling apparatus according to the invention.
Figure 2:
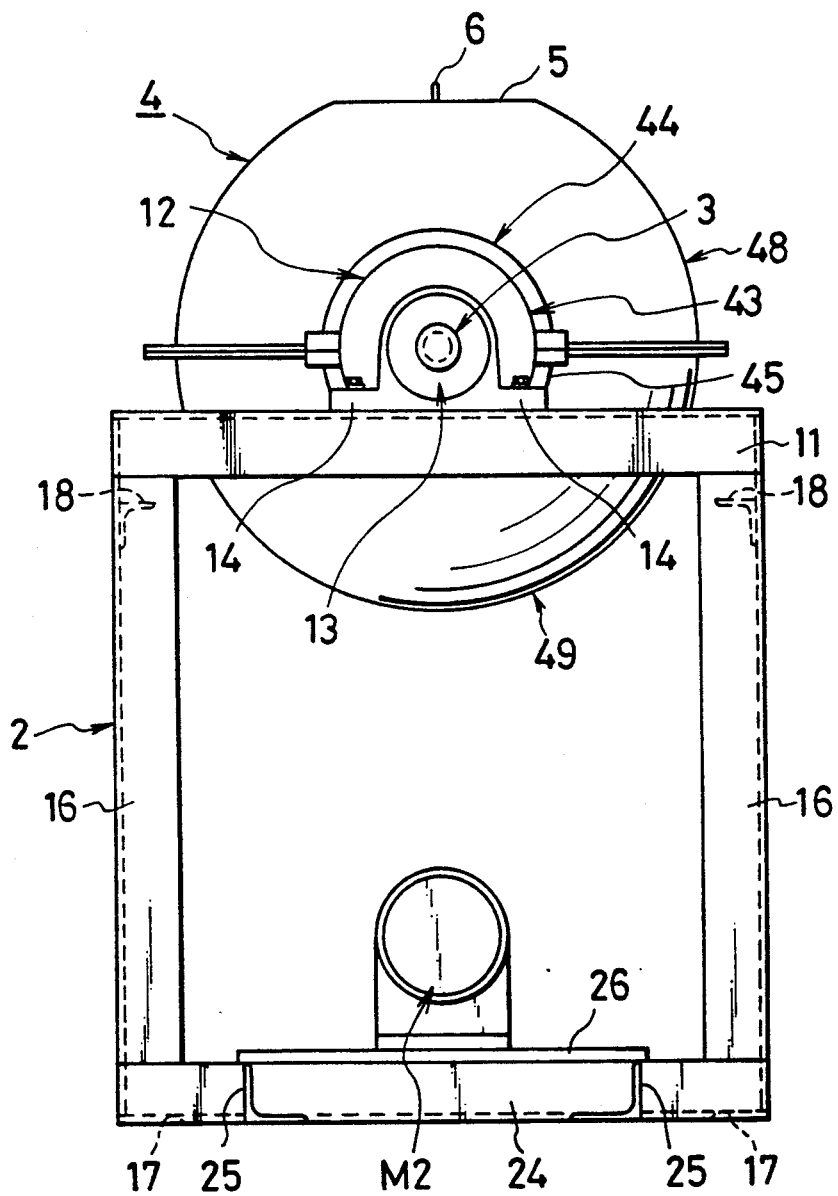
FIG. 2 is a left-hand side elevational view of FIG. 1.
Figure 3:
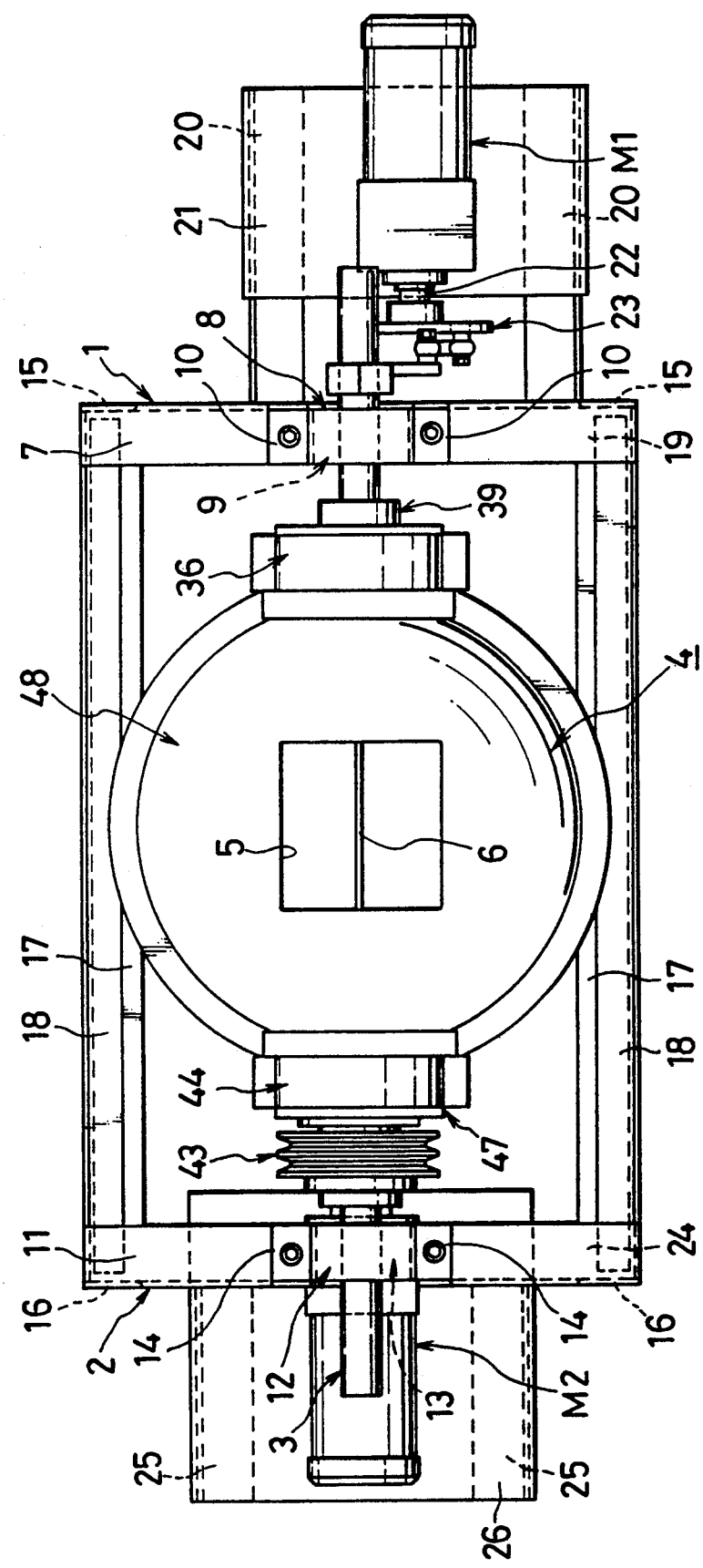
FIG. 3 is a top plan view of FIG. 1.
Figure 4:
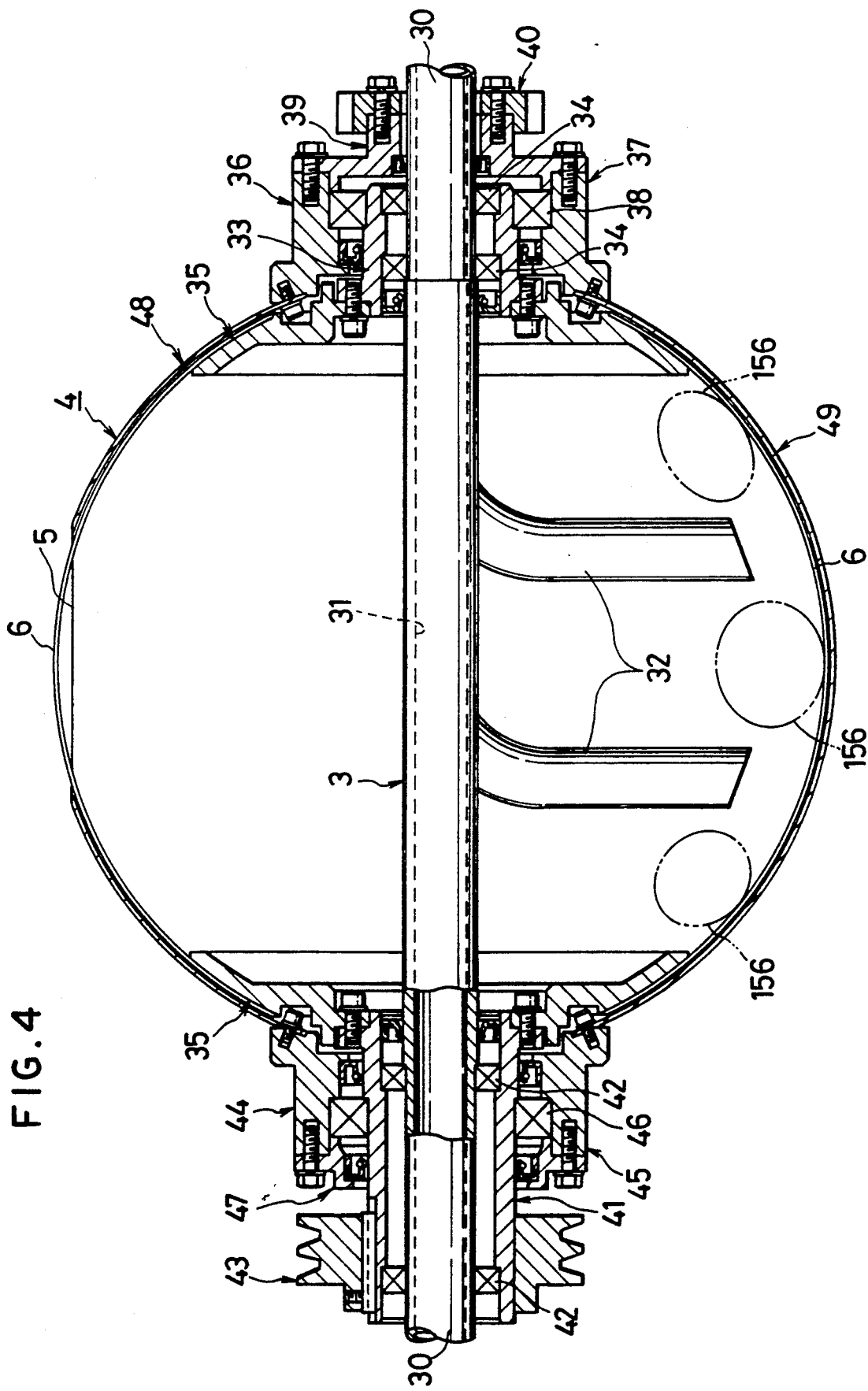
FIG. 4 is an enlarged, longitudinal cross-sectional view of a principal portion in FIG. 1.

Referring first to FIG. 1, there is shown a pair of frames 1 and 2 which are vertically arranged in parallel relation to each other with a spacing left therebetween. An air pipe 3 serving as a support shaft is laterally mounted on the upper parts of the respective frames 1 and 2 for reciprocal angular movement about an axis of the air pipe 3. As shown in FIGS. 2 and 3, a container 4, which has an inner surface curved with respect to the axis of the air pipe 3 and with respect to an axis extending perpendicularly to the axis of the air pipe 3, preferably spherically shaped, is arranged for angular movement relative to the air pipe 3. The container 4 is formed therein with an inlet port 5 which opens upwardly, A plurality of arcuate cutting edges 6, which, as shown in FIG. 4, are curved along the inner surface of the container 4 and which are arranged in spaced relationship to each other, are arranged about the air pipe 3 so as to be movable with respect to the container 4, that is, so as to be movable angularly about the axis of the air pipe 3.

The frame 1 has an upper horizontal element 7. The vicinity of a center of the upper horizontal element 7 in the longitudinal direction thereof, has an upper part which is provided with a support 8 as shown in FIGS. 1 and 3. A bearing 9 is fitted in the support 8. A portion of the air pipe 3 adjacent to one end thereof is supported by the bearing 9 for angular movement. The support 8 has a pair of flanges 10 and 10, which are fixedly mounted on an upper surface of the upper horizontal element 7 by bolts.

The frame 2 has an upper horizontal element 11. As shown in FIGS. 1, 2 and 3, a support 12 is arranged at an upper portion of the upper horizontal element 11 adjacent to the center in the longitudinal direction thereof. A bearing 13 is fitted in the support 12. A portion of the air pipe 3 adjacent to the other end thereof is supported by the bearing 13 for angular movement. The support 12 has a pair of flanges 14 and 14, which are fixedly mounted on an upper surface of the upper horizontal element 11 by bolts.

A pair of lower connecting elements 17 are laterally arranged between the lower ends of respective posts 15 in the frame 1 and the lower ends of posts 16 in the frame 2, respectively. A pair of upper connecting elements 18 extending in a parallel relationship to the lower connecting elements 17 are laterally arranged respectively between portions of the posts 15 of the frame 1 adjacent to upper ends thereof and portions of the posts 16 of the frame 2 adjacent to upper ends thereof. Each of the lower connecting elements 17 has both ends thereof which are fixedly mounted respectively on an inner edge of the lower end of a corresponding one of the posts 15 and an inner edge of the lower end of a corresponding one of the posts 16. Each of the upper connecting elements 18 has respective outer surface of one end fixedly mounted on an inner surface of a corresponding one of the posts 15 adjacent to the upper end thereof, and another end fixedly mounted on an inner surface of a corresponding one of the posts 16 adjacent to the upper end thereof.

The frame 1 has a lower horizontal element 19. As shown in FIGS. 1 and 3, a pair of side support elements 20 and 20 extending in a parallel relationship to each other are arranged on the outside of the lower horizontal element 19. The side support elements 20 and 20 have respective upper parts thereof at which a table plate 21 is arranged. The table plate 21 has an upper part on which a motor M1 is arranged. The motor M1 has a motor shaft 22 on which a disc 23 is arranged for angular movement. The side support elements 20 and 20 have respective inner ends thereof which are fixedly mounted on an outer surface of the lower horizontal element 19. The disc 23 is fixedly mounted on the motor shaft 22 of the motor M1.

The frame 1 is composed of the upper horizontal element 7, the posts 15 and 15 and the lower horizontal element 19.

The frame 2 has a lower horizontal element 24. As shown in FIGS. 1, 2 and 3, a pair of side support elements 25 and 25 extending in a parallel relationship to each other are arranged on the outside of the lower horizontal element 24. The side support elements 25 and 25 have respective upper parts thereof on which a table plate 26 is arranged. The table plate 26 has an upper part thereof on which a motor M2 is mounted. A drive pulley 28 is mounted on a motor shaft 27 of the motor M2 for angular movement. The side support elements 25 and 25 have respective inner ends thereof which are fixedly mounted on the outer surface of the lower horizontal element 24. The drive pulley 28 is fixedly mounted on the motor shaft 27 of the motor M2.

The frame 2 is composed of the upper horizontal element 11, the posts 16 and 16 and the lower horizontal element 24.

Figure 5:
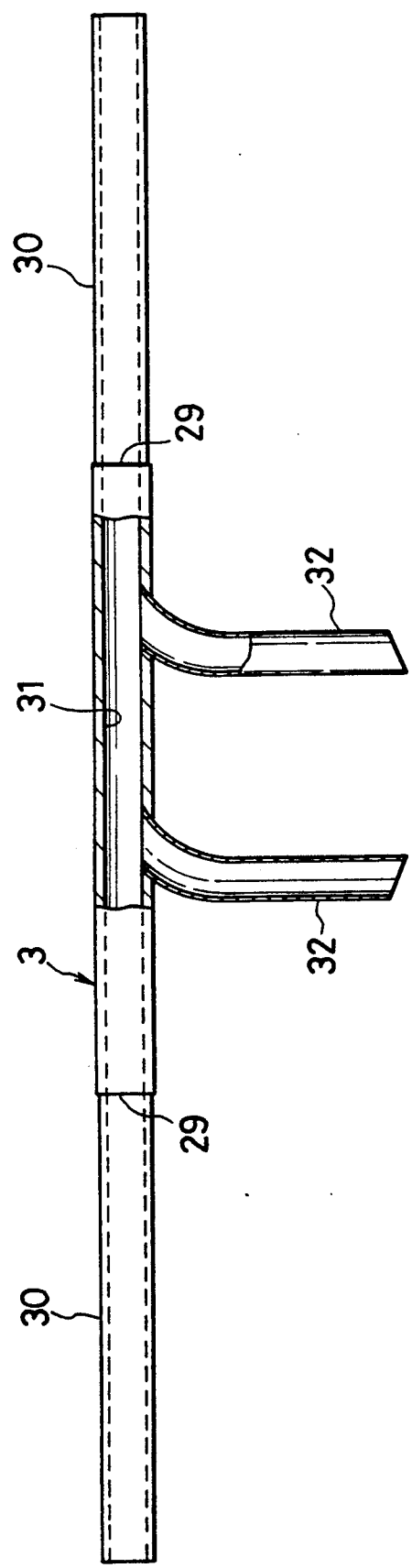
FIG. 5 is a broken-away, front elevational view of a principal portion of an air pipe.

The air pipe 3 has two ends. As shown in FIG. 5, a pair of pivots 30 are formed respectively adjacent to each end of the air pipe 3 through respective steps 29. The air pipe 3 has an interior thereof at which a through bore 31 is formed so as to extend from one end of the air pipe 3 toward the other end thereof. A plurality of injection nozzles 32 and 32 in communication with the through bore 31 are connected to the vicinity of the center of the air pipe 3 in the longitudinal direction thereof so as to extend downwardly. The air pipe 3 has the one end thereof with which air supply means (not shown) of compressed air communicates. The other end of the air pipe 3 is closed.

As shown in FIG. 4, a hollow shaft 33 is arranged for angular movement at the pivot 30 adjacent to one end of the air pipe 30 through a plurality of bearings 34 and 34. The hollow shaft 33 has an inner end thereof on which a holder 35 is arranged. A pair of movable retainers 36 and 37 are arranged on the hollow shaft 33 through a bearing 38 for angular movement. The movable retainers 36 and 37 have respective outer ends thereof on which a presser lid 39 is arranged. The presser lid 39 has an outer end thereof on which a driven gear 40 is arranged.

A hollow shaft 41 is arranged on the pivot 30 adjacent to the other end of the air pipe 3 through a plurality of bearings 42 and 42 for angular movement. The hollow shaft 41 has an inner end on which a holder 35 is arranged. A driven pulley 43 is arranged at a location adjacent to the outer end of the hollow shaft 41. A pair of movable retainers 44 and 45 are arranged on the hollow shaft 41 through a bearing 46 for angular movement. The movable retainers 44 and 45 have respective outer ends thereof on which a presser lid 47 is arranged.

As shown in FIG. 4, the container 4 is arranged between inner ends of respective movable retainers 36 and 37 and respective movable retainers 44 and 45. As shown in FIGS. 1 and 2, the container 4 is composed of a substantially hemispherical upper cover 48 and a substantially hemispherical lower cover 49. An opening which opens toward one side of the upper cover 48 and the lower cover 49, has an peripheral edge which is fixedly mounted on inner ends of the movable retainers 36 and 37. The movable retainers 44 and 45 have respective inner ends thereof. An opening which opens toward the other side of the upper cover 48 and the lower cover 49, has a peripheral edge which is fixedly mounted on the inner end of the movable retainers 44 and 45.

The holder 35 arranged on the inner end of the hollow shaft 33, has an outer surface on which portions of the cutting edges 6 adjacent respectively to one ends thereof, are fixedly mounted. The holder 35 arranged at an inner end of the hollow shaft 41, has an outer surface on which portions of the cutting edges 6 adjacent respectively to the other end thereof, are fixedly mounted. Portions of the cutting edges 6 adjacent to the respective longitudinal centers thereof are exposed to the outside by the input port 5 in the container 4.

The air pipe 3 extends through the container 4. The injection nozzle 32 and 32 of the air pipe 3 are received or accommodated in the container 4. The injection nozzles 32 and 32 have respective lower ends thereof which face toward or are oriented toward the bottom of the container 4.

Figure 6:
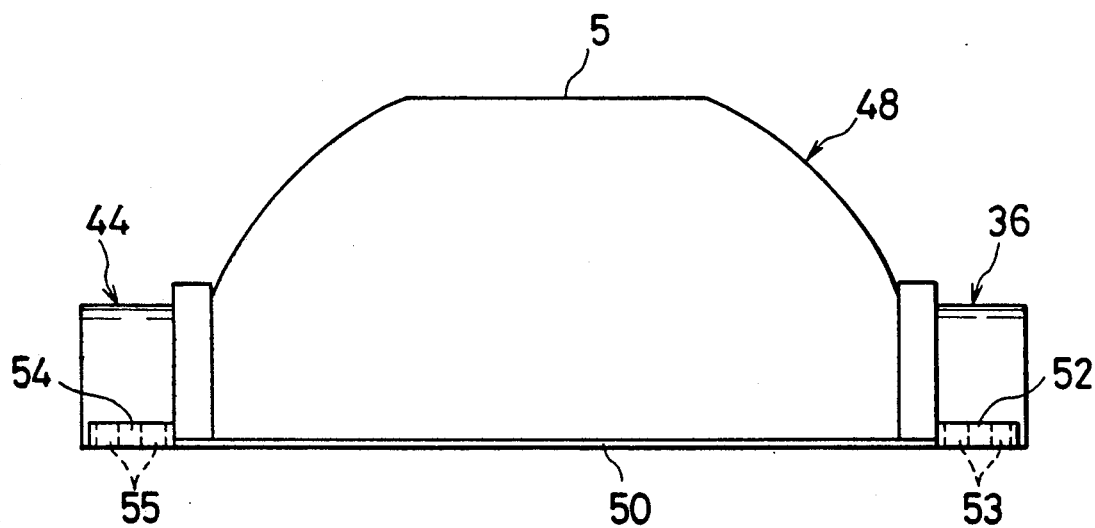
FIG. 6 is a front elevational view showing an upper cover of a container.
Figure 7:
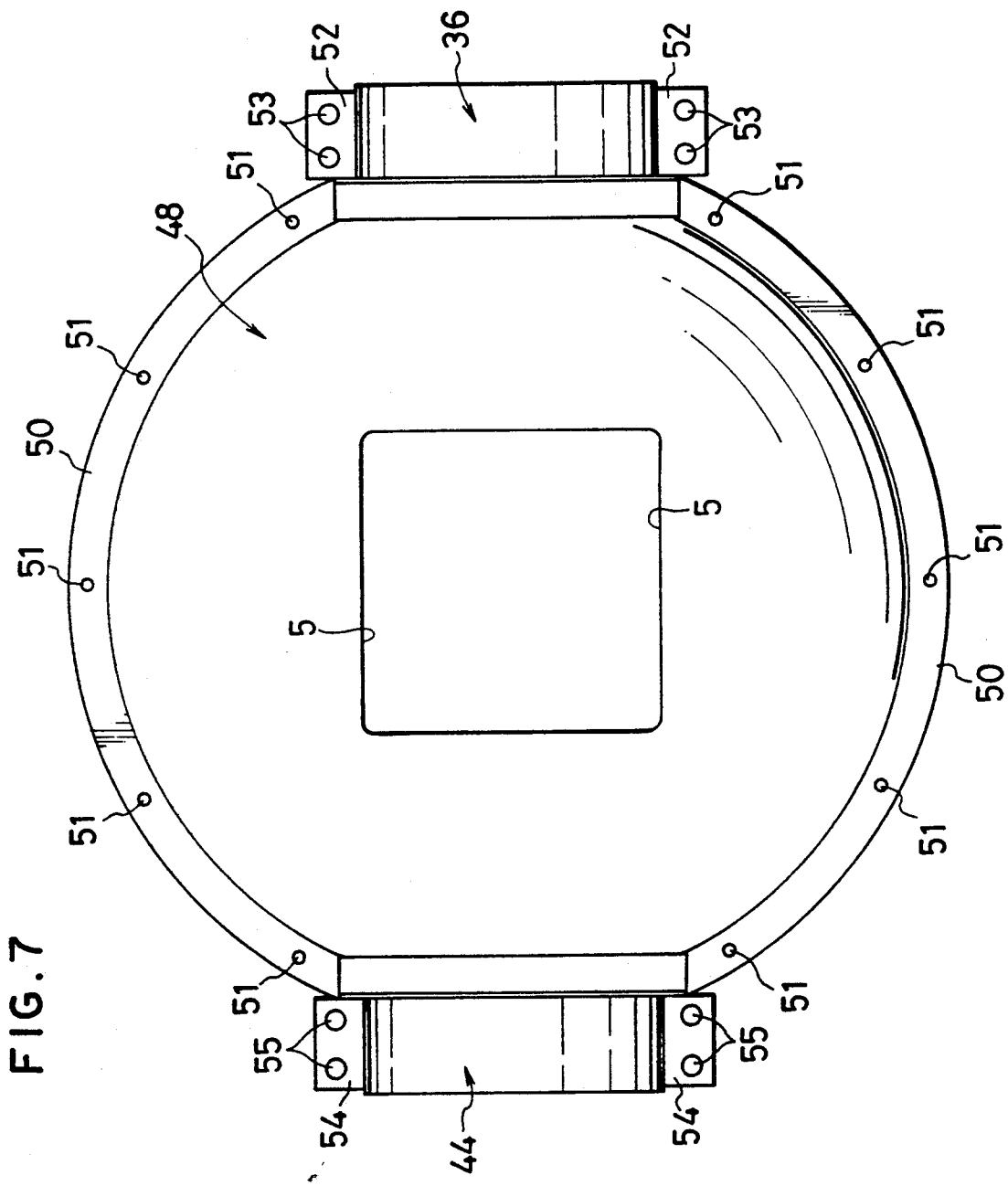
FIG. 7 is a top plan view of FIG. 6.

The container 4 has the upper cover 48 having a top thereof in which, as shown in FIG. 6, the input opening 5 is formed. The upper cover 48 has an peripheral edge thereof on which, as shown in FIG. 7, a flange 50 swelling toward the outside is formed. A plurality of through bores 51 are formed through the flange 50.

The movable retainer 36 and the movable retainer 44 are respectively arranged at the ends of upper cover 48. A pair of flanges 52 and 52 swelling toward the outside are formed respectively on both sides of the movable retainer 36. A plurality of through bores 53 and 53 are formed in the flanges 52. A pair of flanges 54 and 54 swelling toward the outside are formed respectively on both sides of the movable retainer 44. A plurality of through bores 55 and 55 are formed in the flanges 54.

Figure 8:
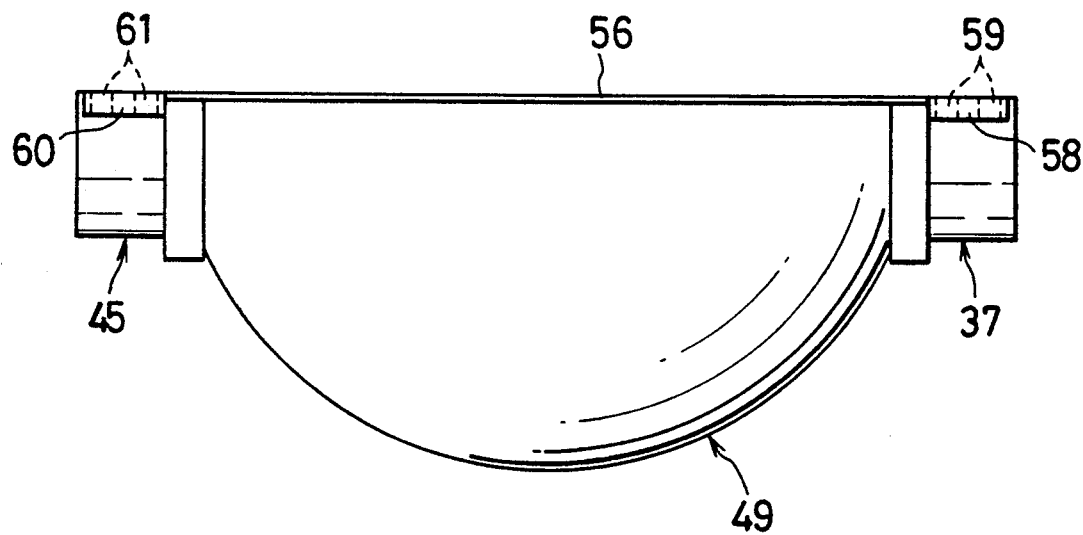
FIG. 8 is a front elevational view showing a lower cover of the container.
Figure 9:
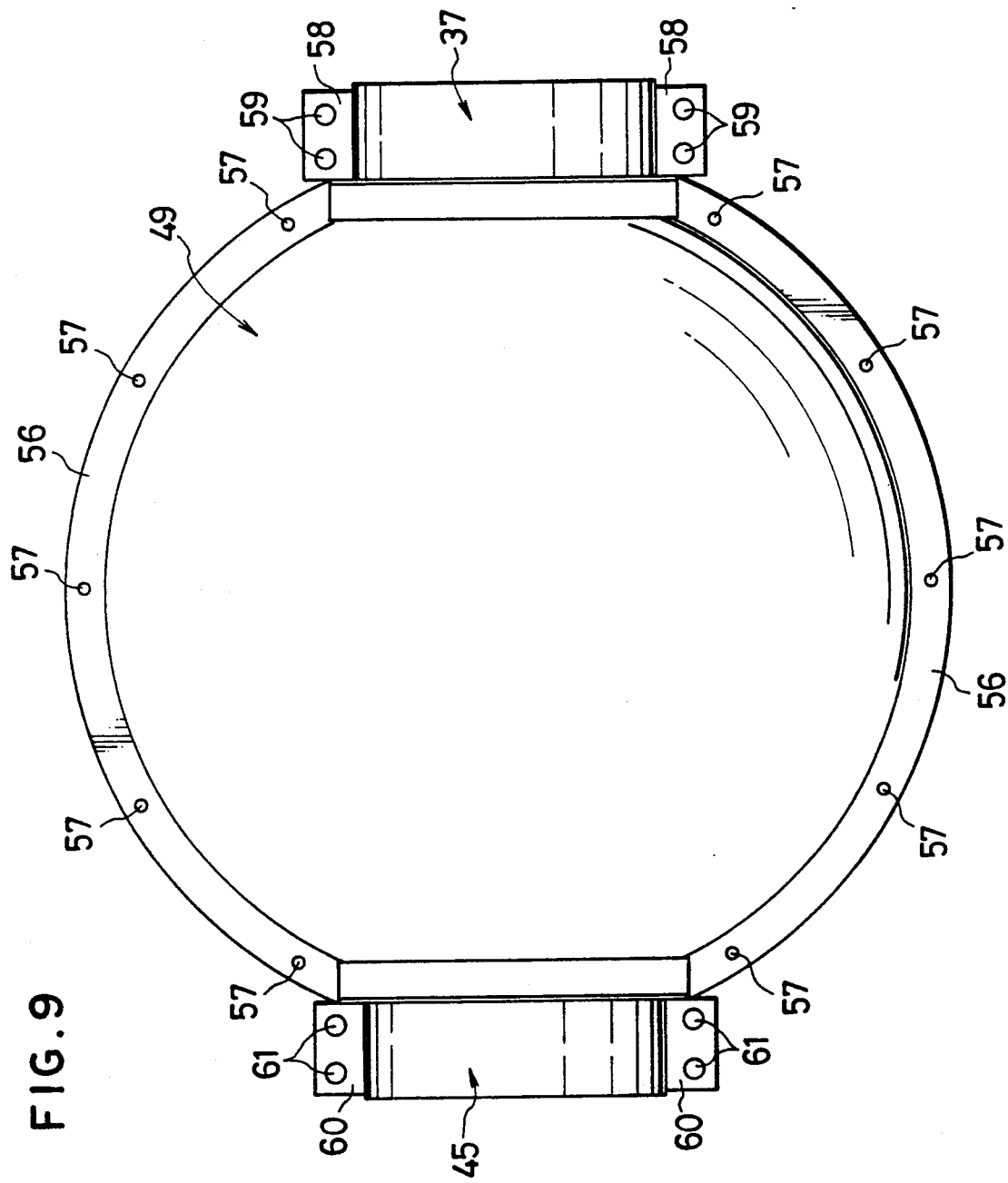
FIG. 9 is a bottom plan view of FIG. 8.

As shown in FIGS. 8 and 9, the lower cover 49 has a peripheral edge thereof on which a flange 56 swelling toward the outside is formed. Formed in the flange 56 are a plurality of through bores 57 which communicate respectively with the through bores 51 in the upper cover 48.

The movable retainer 37 and the movable retainer 45 are arranged respectively at the ends of the lower cover 49. A pair of flanges 58 and 58 swelling toward the outside are formed respectively on both sides of the movable retainer 37. Formed through the flanges 58 are a plurality of through bores 59 and 59 which communicate respectively with the through bores 53 in the movable retainer 36. A pair of flanges 60 and 60 swelling toward the outside are formed respectively on both sides of the movable retainer 45. Formed through the flanges 60 are a plurality of through bores 61 and 61 which communicate respectively with the through bores 55 in the movable retainer 44.

Figure 10:
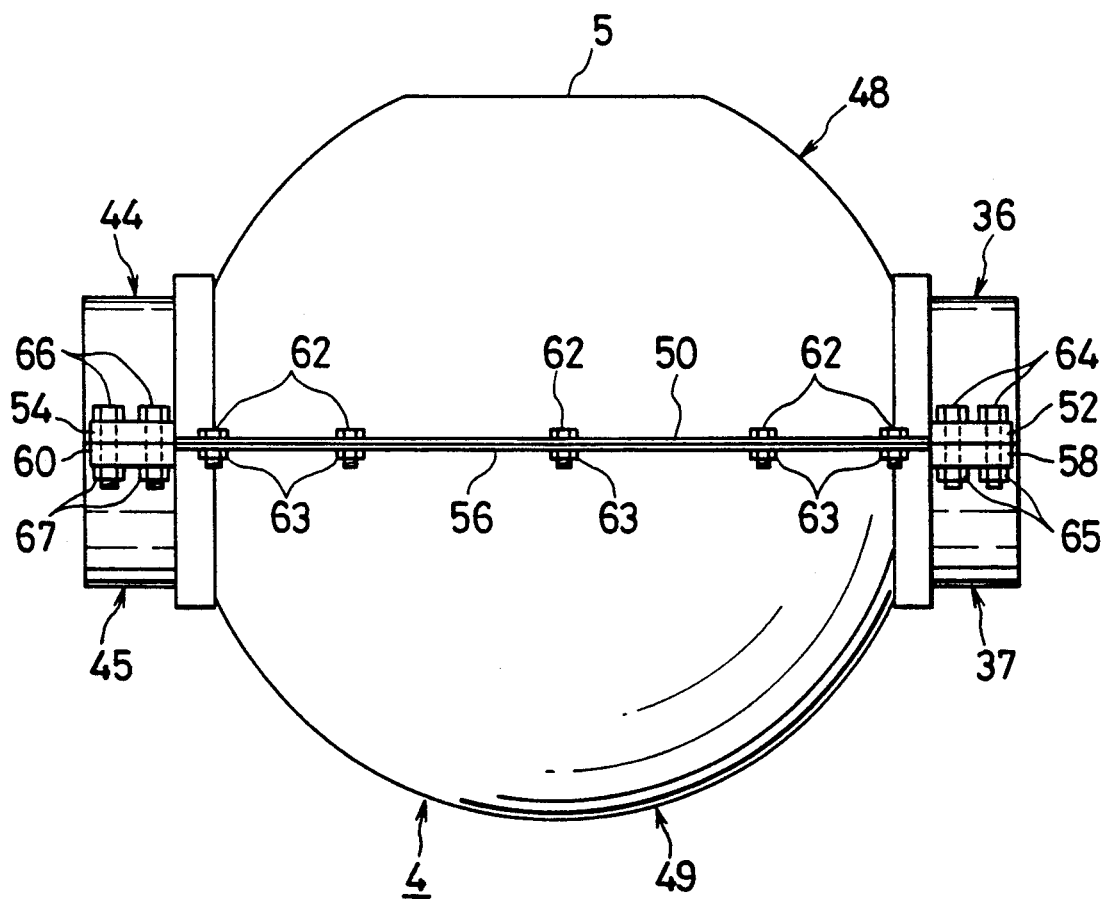
FIG. 10 is a front elevational view showing a mounting condition of the upper cover and the lower cover, and a mounting condition of movable retainers.

Mounting on the upper cover 48 and the lower cover 49 is executed as follows. As shown in FIG. 10, the lower surface of the flange 50 of the upper cover 48 is abutted against the upper surface of the flange 56 of the lower cover 49 and, subsequently, bolts 62 pass, from above, respectively through the through bores 51 in the flange 50 of the upper cover 48 and through the bores 57 in the flange 56 of the lower cover 49. Nuts 63 are threadedly engaged respectively with the bolts 62. By doing so, the upper cover 48 and the lower cover 49 are fixedly mounted on each other. The container 4 is defined by the upper cover 48 and the lower cover 49.

Further, mounting of the movable retainer 36 and the movable retainer 37 is executed as follows. The lower surfaces of the respective flanges 52 of the movable retainer 36 are abutted respectively against the upper surfaces of the respective flanges 58 of the movable retainer 37 and, subsequently, bolts 64 pass, from above, respectively through the through bores 53 in the flanges 52 of the movable retainer 36 and through the through bores 59 in the flanges 58 of the movable retainer 37. Nuts 65 are threadedly engaged respectively with the bolts 64. By doing so, the movable retainer 36 and the movable retainer 37 are fixedly mounted on the covers 48 and 49.

Mounting of the movable retainer 44 and the movable retainer 45 is executed as follows. The lower surfaces of the respective flanges 54 of the movable retainer 44 are abutted respectively against the upper surfaces of the respective flanges 60 of the movable retainer 45 and, subsequently, bolts 66 pass, from above, respectively through the through bores 55 in the flanges 54 of the movable retainer 44 and through the through bores 61 in the flanges 60 of the movable retainer 45. Nuts 67 are threadedly engaged respectively with the bolts 66. By doing so, the movable retainer 44 and the movable retainer 45 are fixedly mounted on the covers 48 and 49.

As shown in FIG. 11, the holder 35 is formed with a flange 69 which swells outwardly toward the outer peripheral surface of a tube 68. The flange 69 is formed, in its outer peripheral edge, with an edge receiving section 70 in the form of an umbrella which has a spherical surface. As shown in FIG. 12, a plurality of support grooves 71 are formed in the outer surface of the edge receiving section 70. A plurality of screw bores 72 and 72 are formed through the edge receiving section 70 at respective locations corresponding respectively to the support grooves 71.

Figure 13:
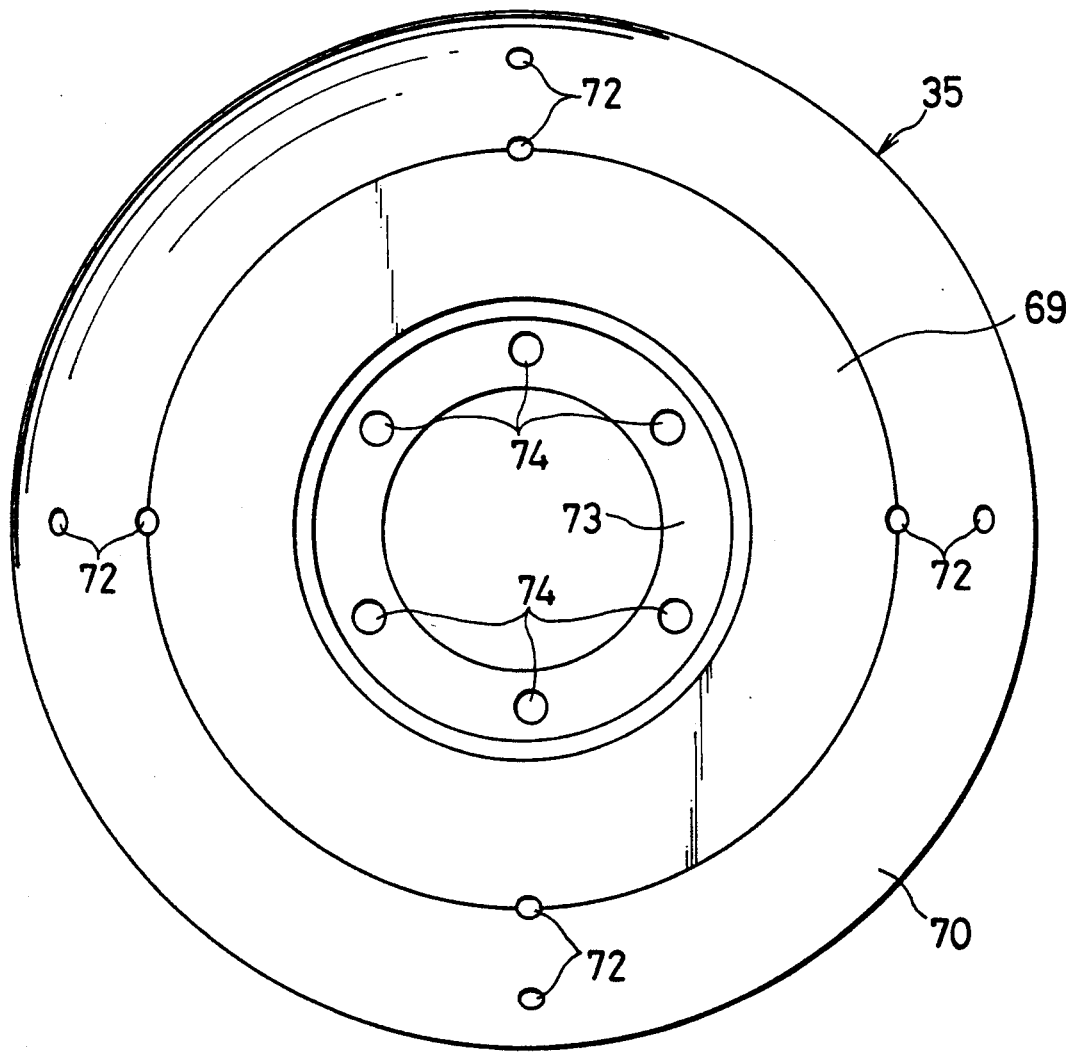
FIG. 13 is a right-hand side elevational view of FIG. 11.

As shown in FIG. 11, the tube 68 of the holder 35 has an inner peripheral surface on which an annular projection 73 is formed. As shown in FIG. 13, a plurality of through bores 74 are formed in the annular projection 73.

Figure 14:
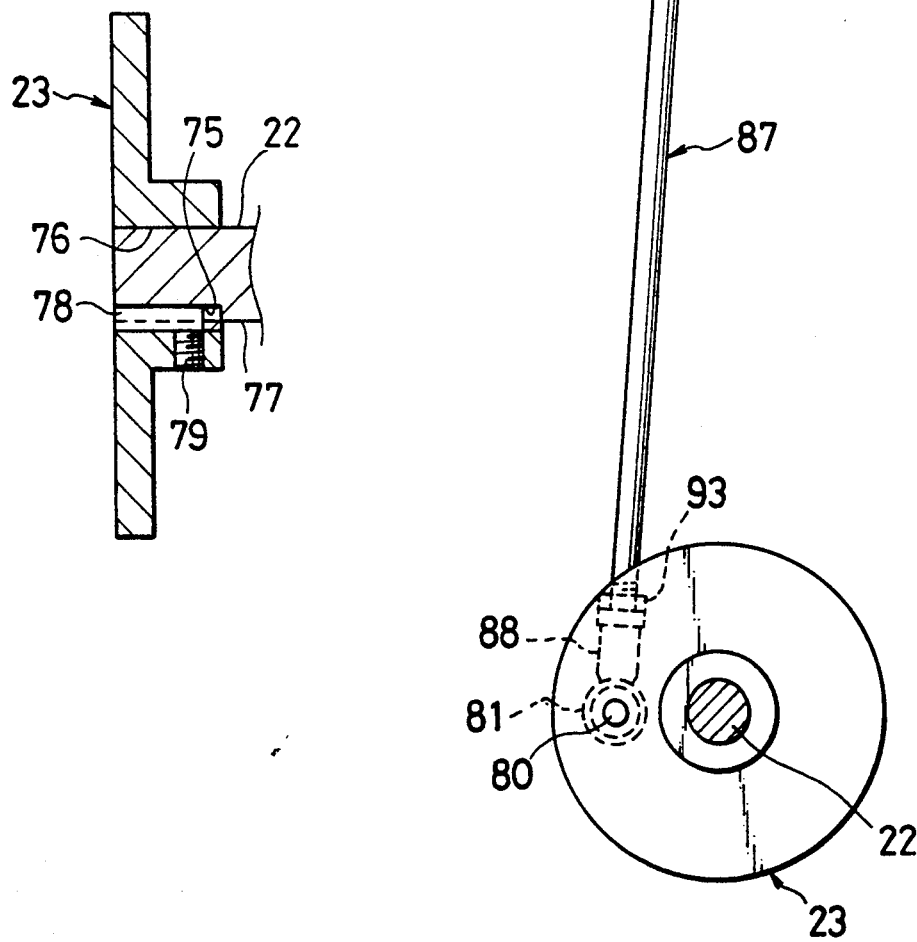
FIG. 14 is a longitudinal cross-sectional view of a principal portion, showing a mounting condition of a disc with respect to a motor shaft.

The motor M1 has the motor shaft 22 whose outer peripheral surface is formed therein with a recessed groove 75, as illustrated in FIG. 14. A fitting bore 76 in the disc 23 has an inner peripheral surface in which a recessed groove 77 is formed. A key 78 is inserted into the recessed groove 75 in the motor shaft 22 and the recessed groove 77 in the disc 23. The key 78 is fixedly mounted on the recessed groove 75 in the motor shaft 22 through a stud bolt 79. The disc 23 is fixedly mounted on the motor shaft 22 by the key 78.

Figure 15:
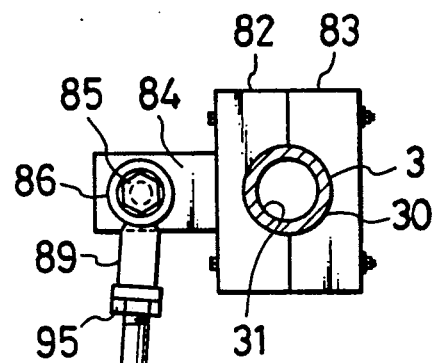
FIG. 15 is a partially broken-away, side elevational view of a principal portion, showing a mounting condition of a swinging rod with respect to the disc and a clamper.

As shown in FIGS. 1 and 15, a bolt 80 is fixedly mounted on the disc 23 at a location eccentric toward the outer peripheral edge of the disc 23 from the center thereof. The bolt 80 is provided with an annulus 81 thereon for angular movement.

As shown in FIG. 15, a pair of clamps 82 and 83 are fixedly mounted on the pivot 30 of the air pipe 3 adjacent to the one end thereof at a location corresponding to the outside of the support 8. The clamp 82 is provided with an extension piece 84 which projects toward the outside. As shown in FIG. 16, a bolt 85 is threadedly engaged with the extension piece 84. The bolt 85 is provided with an annulus 86 for angular movement.

As shown in FIG. 15, a swinging rod 87 is arranged between the annulus 81 of the disc 23 and the annulus 86 of the extension piece 84 of the clamp 82. A connector 88 is arranged at a lower end of the swinging rod 87. A connector 89 is arranged at an upper end of the swinging rod 87. The connector 88 has a lower end thereof which is fixedly mounted on the outer peripheral surface of the annulus 81. The upper end of the connector 89 is fixedly mounted on the outer peripheral surface of the annulus 86.

As shown in FIG. 17, the swinging rod 87 has a portion of an outer peripheral surface thereof adjacent to a lower end thereof, which is formed with a male threaded portion 90. The swinging rod 87 has a portion of the outer peripheral surface thereof adjacent to an upper end thereof which is formed with a male threaded portion 91.

The connector 88 is provided therein with a threaded bore 92. The male threaded portion 90 of the swinging rod 87 is threadedly engaged with the threaded bore 92 in the connector 88. A locking nut 93 is threadedly engaged with the male threaded portion 90 of the swinging rod 87.

The connector 89 is provided therein with a threaded bore 94. The male threaded portion 91 of the swinging rod 87 is threadedly engaged with the threaded bore 94 in the connector 89. A locking nut 95 is threadedly engaged with the male threaded portion 91 of the swinging rod 87.

Figure 18:
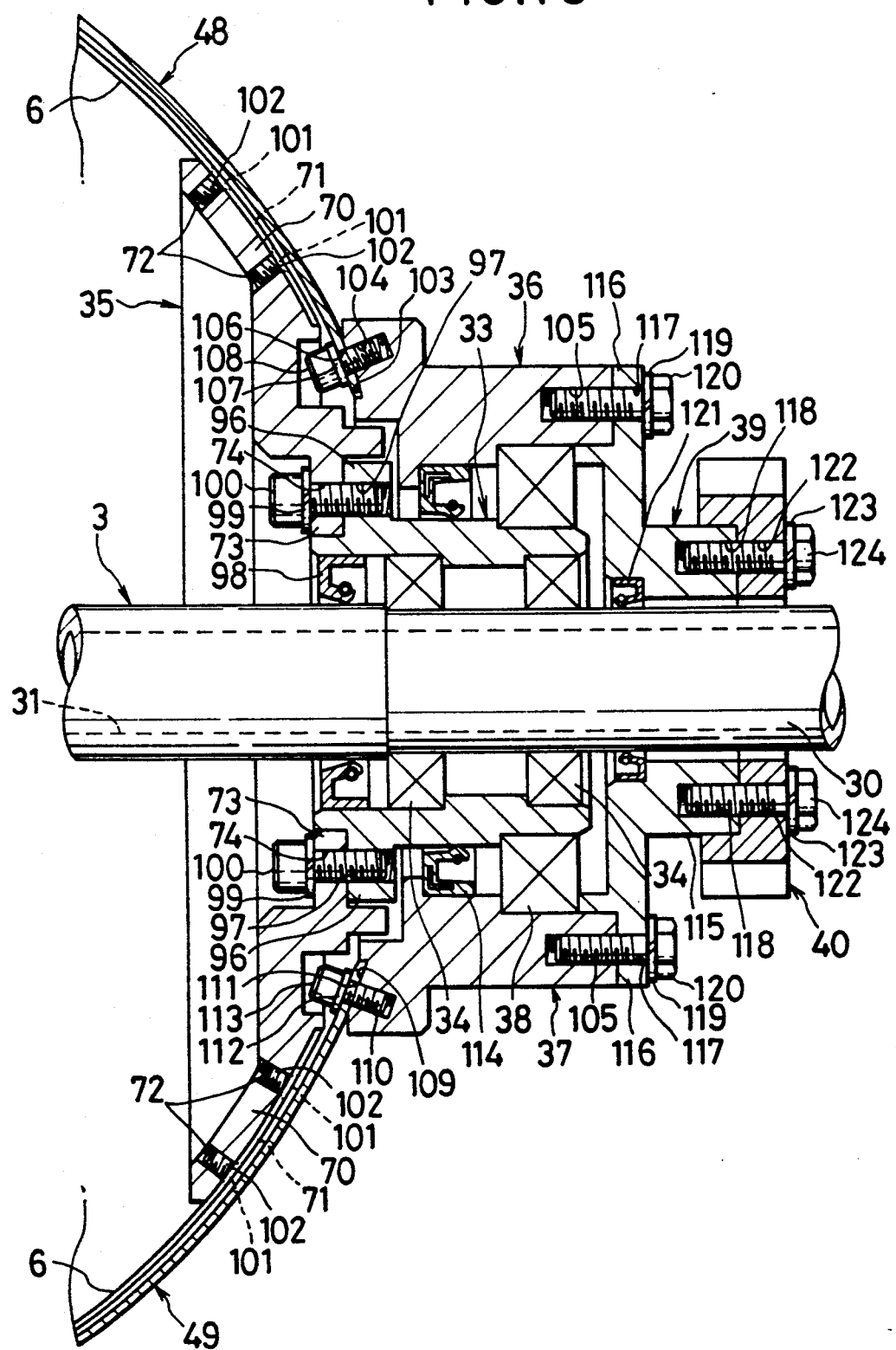
FIG. 18 is an enlarged cross-sectional view of a principal portion in FIG. 4.

As shown in FIG. 18, the hollow shaft 33 has a portion of an outer peripheral surface thereof adjacent to the inner end thereof, which is formed with a flange 96 swelling toward the outside. The flange 96 is provided therein with a plurality of threaded bores 97 which communicate respectively with the through bores 74 in the annular projection 73 of the holder 35. An oil seal 98 is arranged between the outer peripheral surface of the air pipe 3 and the inner peripheral surface of the portion of the hollow shaft 33 adjacent to the inner end thereof.

A plurality of bolts 100 are inserted respectively into the through bores 74 in the annular projection 73 of the holder 35 through washers 99. Each of the bolts 100 has a forward end thereof which is threadedly engaged with a corresponding one of the threaded bores 97 in the flange 96 of the hollow shaft 33. The holder 35 is fixedly mounted on the inner end of the hollow shaft 33 by the bolts 100.

As shown in FIG. 18, a portion of each of the cutting edges 6 adjacent to one end thereof is fitted in a corresponding one of the support grooves 71 in the edge receiving section 70 of the holder 35. A plurality of fitting bores 101 and 101, which communicate respectively with the threaded bores 72 and 72 in the edge receiving section 70, are provided on a portion of the cutting edge 6 adjacent to the one end thereof. A pair of screws 102 and 102 are threadedly engaged, from the outside, respectively with the threaded bores 72 and 72 in the edge receiving section 70. The screws 102 and 102 have respective heads thereof which are fitted in the fitting bores 101 and 101 in the cutting edge 6, respectively. A portion of each of the cutting edges 6 adjacent to one end thereof is fixedly mounted on a corresponding one of the support grooves 71 in the edge receiving section 70 of the holder 35, by the screws 102 and 102.

The movable retainer 36 has an inner end surface which is formed therein with an arcuate fitting groove 103. The fitting groove 103 is provided with a threaded bore 104, and a threaded bore 105 is provided in the outer end surface of the movable retainer 36.

One end of the upper cover 48 has a peripheral edge thereof which opens toward the one end of the upper cover 48 and which is fitted in the fitting groove 103 in the movable retainer 36. The upper cover 48 has the one end thereof whose peripheral wall is provided therein with a through bore 106 which communicates with the threaded bore 104 in the movable retainer 36. A bolt 108 is inserted into the through bore 106 in the upper cover 48 through a washer 107. The bolt 108 has a forward end thereof which is threadedly engaged with the threaded bore 104 in the movable retainer 36. The upper cover 48 has one end portion thereof which is fixedly mounted on the inner end of the movable retainer 36 through the bolt 108.

A slight gap is defined between the cutting edges 6 and the upper cover 48.

As shown in FIG. 18, the movable retainer 37 has an inner end surface which is formed therein with an arcuate fitting groove 109 continuous to the fitting groove 103 in the movable retainer 36. The fitting groove 109 is provided therein with a threaded bore 110. The movable retainer 37 has an outer end surface thereof which is provided therein with a threaded bore 105 similarly to the movable retainer 36.

One end of the lower cover 49 has a peripheral edge thereof which opens toward the one end of the lower cover 49 and which is fitted in the fitting groove 109 in the movable retainer 37. A through bore 111, which communicates with the threaded bore 109 in the movable retainer 37, is provided in the peripheral edge of the one end portion of the lower cover 49. A bolt 113 is inserted into the through bore 111 in the lower cover 49 through a washer 112. The bolt 113 has a forward end thereof which is threadedly engaged with the threaded bore 110 in the movable retainer 37. One end portion of the lower cover 49 is fixedly mounted on the inner end of the movable retainer 37 through the bolt 113.

A slight gap is defined between the cutting edges 6 and the lower cover 49.

An oil seal 114 is arranged between the outer peripheral surface of the hollow shaft 33 and the inner peripheral surfaces of the respective movable retainers 36 and 37.

As shown in FIG. 18, the presser lid 39 is formed with a flange 116 on an outer peripheral surface of a tube 115 adjacent to an inner end thereof. The flange 116 is provided with a plurality of through bores 117 which communicate respectively with the threaded bores 105 in the outer end surfaces of the movable retainers 36 and 37. The tube 115 has an outer end surface thereof which is provided with a plurality of threaded bores 118.

A plurality of bolts 120 are inserted respectively in the through bores 117 in the flange 116 of the pressure lid 39 through washers 119. The bolts 120 have respective forward ends thereof which are threadedly engaged respectively with the threaded bores 105 in the movable retainers 36 and 37. The pressure lid 39 is fixedly mounted on the outer ends of the respective movable retainers 36 and 37 by bolts 120.

An oil seal 121 is arranged between the outer peripheral surface of pivot 30 adjacent to the one end of the air pipe 3 and a portion of the inner peripheral surface of the pressure lid 39 adjacent to the inner end thereof.

As shown in FIG. 18, the driven gear 40 is provided with a plurality of through bores 122 which communicate respectively with the threaded bores 118 in the presser lid 39. A plurality of bolts 124 are inserted respectively into the through holes 122 in the driven gear 40 through washers 123. Each of the bolts 124 has a forward end thereof which is threadedly engaged with a corresponding one of the threaded bores 118 in the presser lid 39. The driven gear 40 is fixedly mounted on the outer end of the presser lid 39 by the bolts 124.

A drive gear (not shown) is in mesh with the driven gear 40. The drive gear is moved angularly manually or by a motor (not shown). The driven gear 40 restricts rotation of the movable retainers 36 and 37 with respect to the hollow shaft 33.

Figure 19:
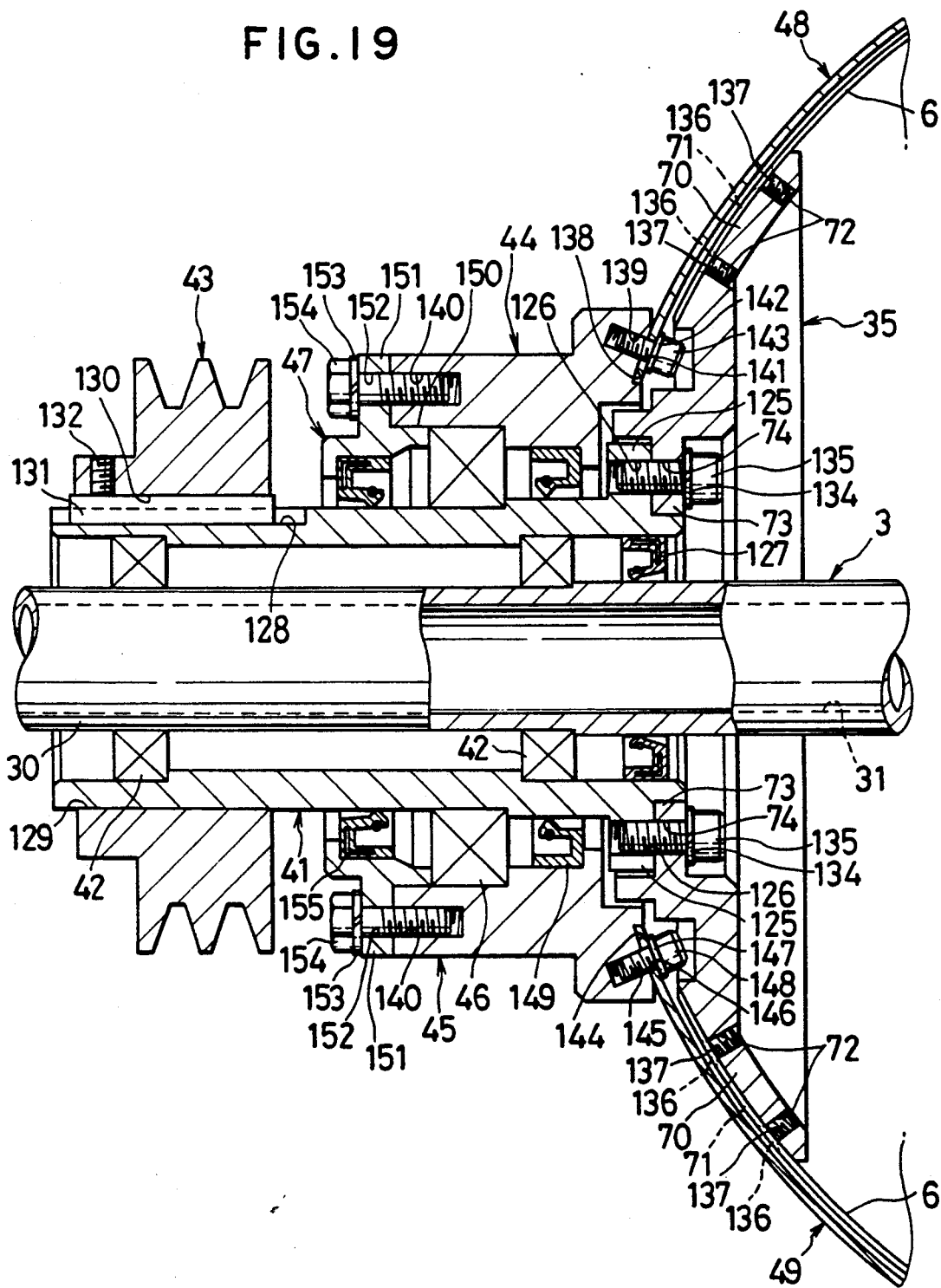
FIG. 19 is an enlarged cross-sectional view of a principal portion in another position in FIG. 4.

As shown in FIG. 19, the hollow shaft 41 has a portion of an outer peripheral surface thereof adjacent to the inner end thereof which is formed with a flange 125. The flange 125 is provided therein with a plurality of threaded bores 126 which communicate respectively with the through bores 74 in the annular projection 73 of the holder 35. An oil seal 127 is arranged between the outer peripheral surface of the air pipe 3 and a portion of the inner peripheral surface of the hollow shaft 41 adjacent to the inner end thereof.

The driven pulley 43 is fitted about a portion of the hollow shaft 41 adjacent to the outer end thereof. A recessed groove 128 is formed in a portion of the outer peripheral surface of the hollow shaft 41 adjacent to the outer end thereof. A recessed groove 130 is formed in the inner peripheral surface of the fitting bore 129 in the driven pulley 43. A key 131 is inserted into the recessed groove 128 in the hollow shaft 41 and in the recessed groove 130 in the driven pulley 43. The key 131 is fixedly mounted on the recessed groove 128 in the hollow shaft 41 by a bolt 132. The driven pulley 43 is fixedly mounted on the hollow shaft 41 by the key 131.

As shown in FIG. 1, a belt 133 extends in tension between the drive pulley 28 and the driven pulley 43.

A plurality of bolts 135 are inserted respectively into the through bores 74 in the annular projection 73 of the holder 35 through washers 134. Each of the bolts 135 has a forward end thereof which is threadedly engaged with a corresponding one of the threaded bore 126 in the flange 125 of the hollow shaft 41. The holder 35 is fixed with respect to the inner end of the hollow shaft 41 by the bolts 135.

As shown in FIG. 19, each of the cutting edges 6 has a portion thereof adjacent to the other end thereof, which is inserted into the support groove 71 in the edge receiving section 70 of the holder 35. The portion of the cutting edge 6 adjacent to the other end thereof is provided with a plurality of fitting bores 136 and 136 which communicate respectively with the threaded bores 72 and 72 in the edge receiving section 70. Screws or bolts 137 and 137 are threadedly engaged respectively with the threaded bores 72 and 72 in the edge receiving section 70 from the outside. The screws 137 and 137 have respective heads thereof which are fitted respectively in the fitting bores 136 and 136 in the cutting edge 6. A portion of the cutting edge 6 adjacent to the other end thereof is fixedly mounted on the support groove 71 in the edge receiving section 70 of the holder 35 by screws 137 and 137.

The movable retainer 44 has an inner peripheral surface thereof which is formed therein with an arcuate fitting groove 138. A plurality of threaded bores 139 are provided in the fitting groove 138. The movable retainer 44 has an outer end surface thereof which is provided with a plurality of threaded bores 140.

An opening end of the upper cover 48 has a peripheral edge which is fitted in the fitting groove 138 in the movable support 44. The upper cover 48 has an end whose peripheral edge is provided with a plurality of through bores 141 which communicate respectively with the threaded bores 139 in the movable retainer 44. A plurality of bolts 143 are inserted respectively into the through bores 141 in the upper cover 48 through washers 142. Each of the bolts 143 has a forward end thereof which is threadedly engaged with a corresponding one of the threaded bores 139 in the movable retainer 44. The other end of the upper cover 48 is fixedly mounted on the inner end of the movable retainer 44 by the bolts 143.

As shown in FIG. 19, the movable retainer 45 has an inner end surface which is formed with an arcuate fitting groove 144 which is continuous to the fitting groove 138 in the movable retainer 44. The fitting groove 144 is provided with a threaded bore 145. The movable retainer 45 has an outer end surface which is provided with a threaded bore 140 similarly to the movable retainer 44.

The lower cover 49 has an opening end whose peripheral edge is fitted in the fitting groove 144 in the movable retainer 45. The lower cover 49 has an end whose peripheral edge is provided with a through bore 146 which communicates with the threaded bore 145 in the movable retainer 45. A bolt 148 is inserted into the through bore 146 in the lower cover 49 through a washer 147. The movable retainer 45 has the threaded bore 145 with which the forward end of the bolt 148 is threadedly engaged. The other end of the lower cover 49 is fixed with respect to the inner end of the movable retainer 45 by the bolt 148.

An oil seal 149 is arranged between the outer peripheral surface of the hollow shaft 41 and inner peripheral surfaces of the respective movable retainers 44 and 45.

As shown in FIG. 19, the presser lid 47 is formed with a flange 151 on an outer peripheral surface of a tube 150. The flange 151 is provided therein with a plurality of through bores 152 which communicate respectively with the threaded bores 140 in the outer end surfaces of the movable retainers 44 and 45.

A plurality of bolts 154 are inserted respectively into the through bores 152 in the flange 151 of the presser lid 47 through washers 153. Each of the bolts 154 has a forward end thereof which is threadedly engaged with a corresponding one of the threaded bores 140 in the movable retainers 44 and 45. The presser lid 47 is fixedly mounted on the outer ends of the respective movable retainers 44 and 45 by the bolts 154.

An oil seal 155 is arranged between an outer peripheral surface of the pivot 30 adjacent to the end of the air pipe 3 and the inner peripheral surface of the presser lid 47.

Operation of the embodiment will next be described.

First, potatoes 156 are thrown into the container 4 through the input port 5 in the upper cover 48 and, subsequently, the motor M1 is driven. Then, the disc 23 is rotated by driving of the motor M1. The bolt 80 moves in a circle while moving the swinging rod 87 vertically during rotation of the disc 23. The swinging rod 87 moves the extension piece 84 of the clamp 82 vertically through the bolt 85 during movement of the bolt 80. The air pipe 3 is angularly moved with respect to the support 8 and the support 12 during vertical movement of the extension piece 84 of the clamp 82. The injection nozzles 32 swing during angular movement of the air pipe 3.

When compressed air is supplied to the air pipe 3 by the air supply means, the compressed air flows to the injection nozzles 32 through the through bore 31 in the air pipe 3. The compressed air is injected toward the inner surface of the lower cover 49 through the injection ports while the injection nozzles 32 are swung. The potatoes 156 received in the container 4 are agitated or stirred by the swinging movement of the injection nozzles 32.

When the motor M2 is driven, the drive pulley 28 is rotated by the driving of the motor M2. The belt 133 transmits the rotation of the drive pulley 28 to the driven pulley 43. The driven pulley 43 is rotated in the same direction as the drive pulley 28, by the bolt 133. The hollow shaft 33 and the hollow shaft 41 are moved angularly with respect to the air pipe 3 during the rotation of the driven pulley 43 and, simultaneously, the holders 35 and 35 are moved angularly together with the hollow shaft 33 and the hollow shaft 41. The cutting edges 6 are moved angularly along the inside of the container 4 by the holders 35 and 35. In this manner, cuticles or epidermises of the potatoes 156 within the container 4 are peeled off by the cutting edges 6. There is no case where the compressed air injected from the injection ports in the respective injection nozzles prevents the cuticles of epidermises of the potatoes 156 from adhering to the cutting edges 6.

When peeling operation of the cuticles or epidermises of the potatoes 158 within the container 4 has been completed, the drive gear is moved angularly, manually or by the motor, whereby the driven gear 40 is rotated while being in mesh with the drive gear. The movable retainers 36 and 37 and the movable retainers 44 and 45 are moved angularly with respect to the hollow shaft 33 and the hollow shaft 41 during rotation of the driven gear 40. The container 4 is moved angularly together with the movable retainers 36 and 36 and the movable retainers 44 and 45. The input port 5 in the upper cover 48 is directed downwardly or is oriented downwardly. The potatoes 156 and the cuticles or epidermises peeled therefrom within the container 4 are discharged into a receiving tank (not shown) or the like through the input port 5 in the upper cover 48.

What is claimed is:

1. A peeling apparatus comprising:
a frame;
a support shaft laterally mounted on said frame;
a container formed around said support shaft and having an inner surface which is curved with respect to an axis of said support shaft and with respect to an axis extending perpendicularly to said axis of said support shaft; and
cutting means extending along said inner surface of said container and arranged so as to be movable with respect to said container;
wherein said support shaft comprises an air pipe communicating with an air supply means, and
wherein said air pipe is provided with an injection nozzle within said container.

2. A peeling apparatus according to claim 1, wherein said support shaft is reciprocally movable angularly about an axis of said frame.

3. A peeling apparatus according to claim 1, wherein said inner surface of said container is spherical in shape.

4. A peeling apparatus according to claim 1, wherein said container is movable angularly relative to said support shaft, and includes an input port.

5. A peeling apparatus according to claim 1, wherein said cutting means is movable angularly about said axis of said support shaft.

6. A peeling apparatus according to claim 1, wherein said cutting means comprises a plurality of cutting edges spaced from each other.

7. An apparatus for peeling produce comprising:
a container that holds said produce and has a curved inner surface;
a frame that supports said container;
a cutting edge extending along said inner surface of said container and arranged so as to be movable with respect to said container for peeling said produce; and
means for imparting air into said container to agitate said produce during peeling.

8. An apparatus for peeling produce according to claim 7, wherein said means for imparting air comprises:
an air pipe communicating with an external air supply means and mounted on said frame; and
at least one injection nozzle on an underside of said air pipe.

9. An apparatus for peeling produce according to claim 8, wherein,
said air pipe supports and is partially surrounded by said container.

* * * * *